Sept. 8, 1959 R. W. BONNER ET AL 2,903,648
ELECTRICAL AUDIO RANGE SWEEP OSCILLATOR
Filed Aug. 31, 1953
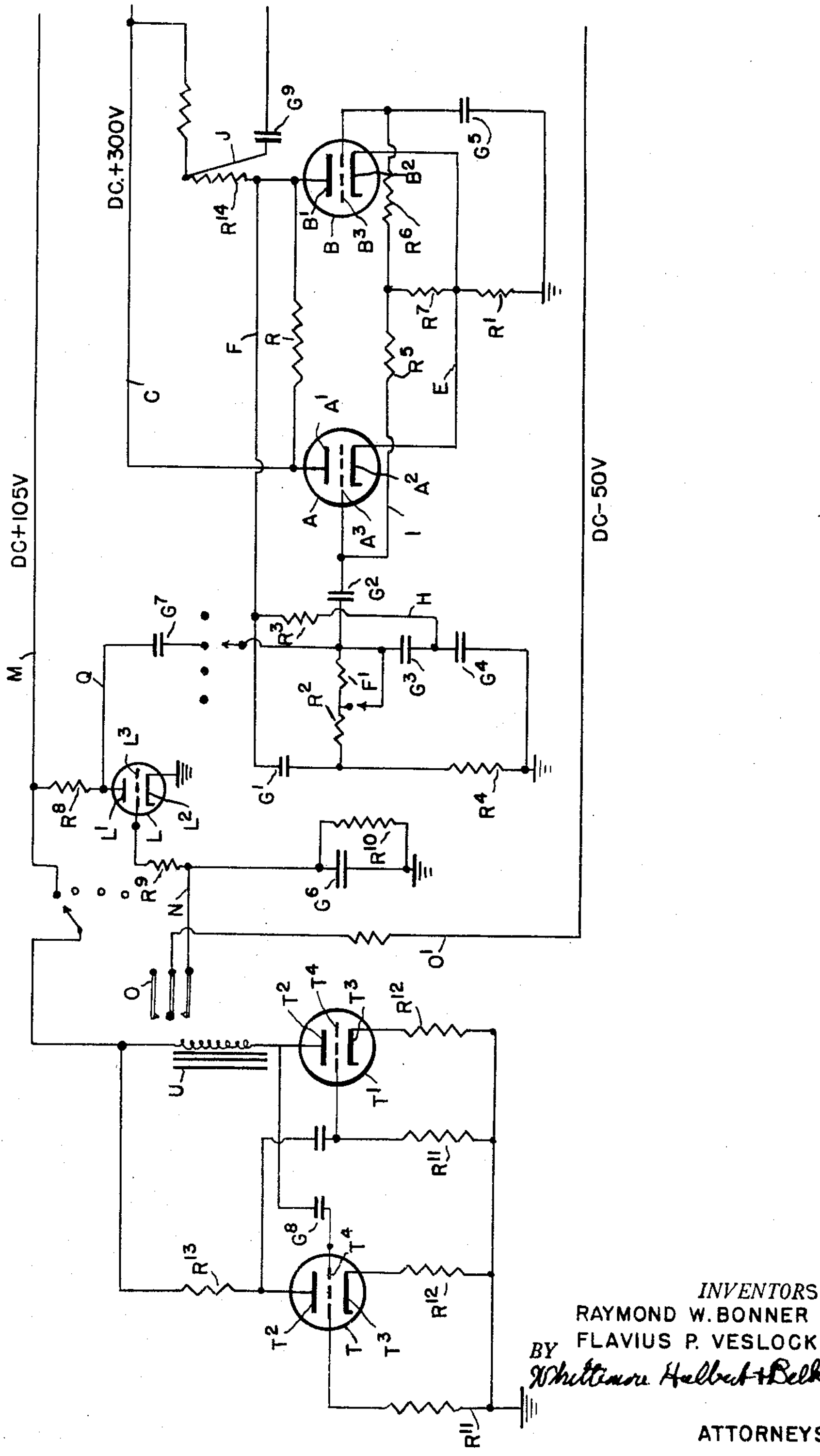
INVENTORS
RAYMOND W. BONNER
FLAVIUS P. VESLOCK
BY Whittemore Hulbert & Belknap
ATTORNEYS 2,903,648

ELECTRICAL AUDIO RANGE SWEEP OSCILLATOR

Raymond W. Bonner and Flavius P. Veslock, Detroit, Mich.

Application August 31, 1953, Serial No. 377,466

4 Claims. (Cl. 331—47)

The invention relates to electrical sweep oscillators and it is the object of the invention to obtain a construction which is within audio range, being more particularly designed for use in operating a siren. In the present state of the art sirens intended for danger warning to a community, and which have an alternating rise and fall in pitch of the sound produced, are usually mechanically operated. The structure required is of considerable bulk and weight and also costly.

It is the object of the invention to obtain a construction which is entirely electrical in its operation and is greatly reduced in bulk, weight and cost, as compared with the mechanically operated structures. Essentially the invention consists in an electronic oscillator which is well within radio frequency, together with means for producing a sweep variation in frequency while still retained within the audio range.

The invention further consists in the more specific construction including vacuum tubes, capacitors, resistors and the circuits connecting the same as hereinafter set forth.

In the drawings:

The single figure is a diagram illustrating the essential electrical elements and the hook-up therefor forming the audio range sweep electronic oscillator.

As specifically illustrated in Figure 1 the audio frequency electronic oscillator comprises a pair of triodes (plate, grid, cathode) A and B which occupy either single or separate high vacuum tubes and a phase shifting network for determining frequency. The plate A′ is connected to a positive lead C from a source of D.C. electrical energy. The plate B′ is also connected to said positive lead but through the medium of a resistor R. The cathodes $A^2$ and $B^2$ are directly connected to each other through a conductor E and both are grounded through a resistor R′. The plate B′ has a feed back connection F to the grid $A^3$ of the triode A including in series a pair of capacitors G′ and $G^2$ with a resistor $R^2$ therebetween. A second pair of capacitors $G^3$ and $G^4$ is in a connection F′ coupled to F at a point between the resistor $R^2$ and capacitor $G^2$ and leading to a ground. A conductor H connected at one end between plate B′ and capacitor G′ and containing a resistor $R^3$ is connected at its opposite end to F between the capacitors $G^3$ and $G^4$ and a ground leak resistor $R^4$ is connected to F between the capacitor G′ and resistor $R^2$. There is a further connection I between the grids $A^3$ and $B^3$ including resistors $R^5$ and $R^6$ and a ground connection between said resistors including another resistor $R^7$. A capacitor $G^5$ is between the grid $B^3$ and a ground.

With the hook-up thus far described the cathodes and the grids being both grounded are of the same potential unless otherwise energized, and consequently there will be negligible flow of currents through the triodes A and B. If, however, a positive potential is placed on the grid $A^3$ and through the connection I and resistors $R^5$ and $R^6$ upon the grid $B^3$ electrical oscillations will be developed. By properly proportioning the elements these oscillations will be within audio frequency and if the grid potential is low the frequency will be in mid audio range. On the other hand an increase in grid potential will increase the frequency of oscillation, and if the potential is alternately increased and diminished between high and low points in slow cycle, a sweep oscillation signal will be obtained. This signal passing through an output connection J including a resistor $R^{14}$ and capacitor $G^9$, if suitably amplified and used to operate a loud speaker will develop a sufficient volume of tone in the latter to form a siren.

To analyze the operation of applicants' oscillator, refer to Figure 1 and first assume that sweep generator triodes A and B will initially have no filament power applied. With the triodes in this condition $G^3$ will charge to the maximum positive potential of the triodes direct current plate supply. During the charging time of $G^3$ capacitors G′, $G^4$, $G^2$ and $G^5$ will also take on a proportional charge. Then when filament power is applied the circuit constants are such that triodes A and B will conduct and their plate voltage will therefore decrease, causing $G^3$ to discharge through $G^2$, $R^5$, $R^7$, B and $R^3$. The voltage drop across $R^5$ and $R^7$ caused by the discharge of $G^3$ will cause triode A to cut off. At this point it should be noted that any voltage drop across $R^7$ and R′ will be applied to $R^6$ and $G^5$ which form a voltage divider network in parallel with $R^7$ and R′, the reactance of $G^5$ being inversely proportional to the frequency of signal applied thereto. Triode A will remain cut off until the voltage across $R^5$ plus $R^7$ is such that the grid voltage is above cut off. This time will depend upon the time constant of the circuit including components $G^3$, $G^2$, $R^5$, $R^7$, B and $R^3$. When triode A starts conducting again, the increased current through R′ causes the cathode potential of triode B to rise, causing B to decrease in conduction which causes the plate voltage of B to increase, $G^3$ will therefore take an increased charge which is positive at the plate of triode B and negative at the grid of triode A. The charging current of $G^3$ which passes through $G^2$, $R^5$, $R^7$, and R′ decreases the bias on triode A which causes A to conduct more. This results in a voltage drop across R′ which will cut off triode B. With B cut off $G^3$ will again charge toward the maximum positive potential of the direct current plate supply and the current through R′ will decrease allowing triode B to conduct starting the process over again. It should also be mentioned in connection with the operation of applicants' device that G′, $G^4$, $G^2$, R′ and $R^2$ function to produce the proper phase shift in the feed back circuit and to form the variable signal applied to the grid of triode A.

Various devices may be used for supplying the grid potential which alternately increases and diminishes in slow cycle. However, as specifically illustrated a variable impedance high vacuum tube L is employed. The plate L′ of this tube is connected through a resistor $R^8$ with a positive lead M of D.C. electrical energy. The cathode $L^2$ is grounded and the grid $L^3$ is connected through a conductor N containing a resistor $R^9$ to a switch or circuit closer O. The latter is operated by means later described to alternately connect and disconnect the conductor N to a negative lead O′ from a source of electrical energy. The operation of the switch is in slow cycle, such for instance as eight or ten cycles per minute with the intervals in which it is opened and closed substantially equal. A capacitor $G^6$ is arranged between the conductor N and a ground with a grid leak resistor $R^{10}$ around said capacitor. A connection Q containing a capacitor $G^7$ extends from the plate L′ to the connection F at a point between the resistor $R^2$ and the capacitor $G^2$.

Assuming that the switch O is operated to alternately open and close the connection between the negative lead O′ and the grid $L^3$ in slow cycle, the operation will be as follows: When the switch O is open the negative potential on the grid $L^3$ will be gradually dissipated through the resistors $R^9$ and $R^{10}$ to the ground. This will increase the flow of current through the variable impedance tube L, and as the plate L′ is supplied with current through the resistor $R^8$, the voltage of the plate will gradually fall. On the other hand, when the switch O is closed, negative potential is gradually applied to the grid L which lessens the flow of current through the tube and gradually increases the voltage of the plate thereof. The plate L′ through the connection Q and capacitors $G^7$ and $G^2$ will produce a corresponding variation in voltage upon the grid $A^3$. This, as previously described, will produce the sweep frequency oscillation in the signal, which after amplification operates the loud speaker.

The switch or circuit closer O might be mechanically operated but preferably it is actuated by electromagnetic means so as to avoid the use of any mechanism. As shown, this is accomplished by a pair of diode tubes T and T′, the plates $T^2$ of which are supplied with current from the positive lead M. Each plate has a ground connection including a capacitor $G^8$ and resistor $R^{11}$. The cathode $T^3$ of each tube is grounded through a resistor $R^{12}$ and the grid $T^4$ is connected between the capacitor $G^8$ and resistor $R^{11}$ of each tube. A resistor $R^{13}$ is between the positive lead and the plate of the first tube and a relay U for operating the switch or circuit closer O is between the positive lead and the plate of the second tube. This hook-up may be tuned for the slow cycle, such as eight cycles per minute, and will correspondingly time the opening and closing of the switch O.

To obtain the desired audio range sweep frequency oscillations in the signal circuit the values of the capacitors and resistors in the hookup must be properly proportioned. Specific values are herein indicated but it will be understood that these are not essential and may be varied. The values given are as follows:

Capacitors in microfarads:

| | |
|---|---|
| G′ | .002 |
| $G^2$ | .5 |
| $G^3$ | .001 |
| $G^4$ | .01 |
| $G^5$ | .1 |
| $G^6$ | 50 mfd. |
| $G^7$ | .006 |
| $G^8$ | 1 mfd. |

Resistors:

| | |
|---|---|
| R | 5K. |
| R′ | 5K. |
| $R^2$ | 50K+50K. |
| $R^3$ | 22K. |
| $R^4$ | 22K. |
| $R^5$ | 2.2 meg. |
| $R^6$ | 2.2 meg. |
| $R^7$ | 3.3 meg. |
| $R^8$ | 390 meg. |
| $R^9$ | 25,000K. |
| $R^{10}$ | 100K. |
| $R^{11}$ | 2 meg. |
| $R^{12}$ | 1K. |
| $R^{13}$ | 12K. |

The energizing D.C. current may be supplied by any suitable means and in value is preferably D.C.+300 volts for the conductors C; D.C.+105 for the conductor M; D.C.−50 volts for the conductor O′.

Whereas in Fig. 1 each triode is a separate vacuum tube

6 SN 7
C may be used for A and B

6 SN 7
A for T and T′ and 6T5 for L.

What we claim as our invention is:

1. An audio frequency sweep oscillator comprising first and second high vacuum tube triodes having their cathodes connected and grounded through a common resistor, the plate of the first triode being connected directly to a direct current lead, the plate of the second triode being connected through a pair of resistors to the direct current lead, said oscillator including means for impressing on the grid of the first triode a positive potential alternately rising and falling in voltage in a cycle of audio frequency, means for impressing said alternating positive potential on the grid of the second triode including two resistors in series between the grids of the first and second triodes and a grounded capacitor connected to the grid of the second triode, feed back means from the plate of the second triode to the grid of the first triode including in series a first capacitor, a first resistor and a second capacitor, and a second resistor with one end connected to the plate of the second triode and a third capacitor in series with said second resistor, said second resistor and third capacitor being connected in parallel with said first capacitor and said first resistor, and signal output means connected to said second triode plate including a resistor connected in series between the plates of the two triode tubes and a capacitor with one end connected between said pair of resistors whereby audio frequency oscillations will be developed which increase and decrease in frequency respectively with said rise and fall of grid potential.

2. The construction as in claim 1 in which the means for supplying rising and falling grid voltage comprises a third triode having a grounded cathode and its plate connected through a series resistor to a positive direct current lead and also connected through a capacitor with said first triode grid, a negative direct current lead, a connection between said negative lead and the grid of said third triode, said connection including a resistor in series between the negative lead and the grid of the third triode, a switch in series between the negative lead and the resistor for alternately opening and closing said connection in slow cycle, a capacitor connected to said connection between said switch and resistor on one side and grounded on the other side, and a grid leak resistor connected in parallel with said last mentioned capacitor.

3. An audio frequency sweep oscillator, comprising a pair of high vacuum tube triodes having their cathodes connected together and grounded through a common resistor and including, a feed back circuit having a first capacitor, a variable resistor and a second capacitor in series respectively from the plate of a first of said triodes to the grid of the second of said triodes, means for impressing on the grid of the second triode an alternately rising and falling positive potential to cause the frequency of the oscillator to sweep through a band of frequencies, and means for connecting the grids of the said triodes including a pair of resistors in series with each other and the grids of the triodes and a third resistor connected at one end to the common junction point of the said pair of resistors and at the other end to the cathodes of said triodes.

4. An audio frequency sweep oscillator, comprising a pair of high vacuum tube triodes having their cathodes connected together and grounded through a common resistor and having their plates connected together through a resistor in series therewith, said oscillator including a feed back circuit having a first capacitor, a variable resistor and a second capacitor in series respectively from the plate of a first of said triodes to the grid of a second of said triodes and an additional resistor and capacitor in series connected in parallel with said first capacitor and variable resistor with one end of the said additional resistor being connected to the plate of the first triode, means for impressing on the grid of the second triode an alternately rising and falling positive potential to cause the frequency of the oscillator to sweep through a band of frequencies in the audio range, and means for connecting the grids of the said triodes including a pair of resistors in series with each other and the grids of the triodes, a third resistor connected at one end to the common junction point of the said pair of resistors and at the other end to the cathode of said triodes and a capacitor connected between the grid of the second triode and ground whereby swept frequency audio oscillations are produced.

References Cited in the file of this patent

UNITED STATES PATENTS

| | | |
|---|---|---|
| 1,632,054 | Brown | June 14, 1927 |
| 2,287,925 | White | June 30, 1942 |
| 2,426,996 | Goodall | Sept. 9, 1947 |
| 2,444,084 | Artzt | June 29, 1948 |
| 2,455,472 | Curl et al. | Dec. 7, 1948 |
| 2,506,329 | Ames | May 2, 1950 |
| 2,540,478 | Frost | Feb. 6, 1951 |
| 2,580,424 | Hanert | Jan. 1, 1952 |
| 2,662,183 | Bridges | Dec. 8, 1953 |
| 2,716,218 | Arsem | Aug. 23, 1955 |
| 2,730,620 | Schmitt et al. | Jan. 10, 1956 |
| 2,777,951 | Charlton | Jan. 15, 1957 |